United States Patent [19]

Hale et al.

[11] 4,101,905
[45] Jul. 18, 1978

[54] METHOD FOR WRITING AND VIEWING MAGNETIC HUMAN READABLE CHARACTERS AND VIEWING MEANS THEREFOR

[75] Inventors: William J. Hale, Kettering; William R. Horst, Dayton; Donald A. Walker, Kettering, all of Ohio

[73] Assignee: NCR Corporation, Dayton, Ohio

[21] Appl. No.: 749,591

[22] Filed: Dec. 10, 1976

[51] Int. Cl.² ................... G03G 19/00; G01R 33/00
[52] U.S. Cl. ........................... 346/74.1; 324/212; 360/117
[58] Field of Search ............ 360/2, 3, 56, 13, 14, 360/15, 31, 137, 117; 324/34 TA, 34 PC, 38; 346/74.1

[56] References Cited

U.S. PATENT DOCUMENTS

| | | | |
|---|---|---|---|
| 2,530,564 | 11/1950 | Blaney | 360/137 |
| 3,013,206 | 12/1961 | Youngquist | 360/31 |
| 3,699,587 | 10/1972 | Currie | 346/74.1 |
| 3,947,879 | 3/1976 | Stauffer | 346/74.1 |
| 3,982,334 | 9/1976 | Tate | 346/74.1 |
| 3,988,738 | 10/1976 | Wu | 346/74.1 |

*Primary Examiner*—Jay P. Lucas
*Attorney, Agent, or Firm*—J. T. Cavender; Albert L. Sessler, Jr.; Elmer Wargo

[57] ABSTRACT

A multi-track magnetic recording head is used to record data in human readable form on a magnetic track on a record medium. A viewer, having a viewing window containing microencapsulated ferromagnetic particles, is used to read the data. When the viewing window is placed in operative proximity with the magnetic track, an image corresponding to the data on the track is formed on the viewing window to enable a user of the record medium to read the data thereon. The image on the viewing window is erased after reading by providing relative movement between the viewing window and a magnetic field.

17 Claims, 7 Drawing Figures

METHOD FOR WRITING AND VIEWING MAGNETIC HUMAN READABLE CHARACTERS AND VIEWING MEANS THEREFOR

BACKGROUND OF THE INVENTION

This invention relates to a method for writing and viewing magnetic, human readable characters and a viewing means therefore which can be used, for example, in a security system like a credit card system employing "debit" balances.

Statistics indicate that only about one third of the adult population in the United States has accepted the concept of a "credit card" or credit purchases. Another one third of the adult population has not established a satisfactory credit base and is consequently refused the use of credit cards by financial institutions. The final one third of the adult population does not believe in credit and prefers the "pay as you go" concept.

To avoid collection difficulties associated with the second one third of the adult population mentioned, and to appeal to the credit avoidance tendencies of the final one third, the concept of a "debit" card has been introduced. Private banking institutions, as well as national credit card companies, are establishing "debit card systems", which in effect, represent pre-deposited funds. Because the account balances associated with the debit cards represent the pre-deposited funds, they can be used by the credit-risky, one third of the adult population, and should be acceptable to the final one third of the adult population which prefers the "pay as you go" concept.

A debit card user deposits cash into his account, and his account is maintained by electronic terminals which deduct from his account the amounts of purchases as they are made by him. His debit card is continually updated by the terminals so that his card always has a balance thereon which reflects the amount which he has available for purchases. In order to keep track of the balance on his debit card, the user of the card must keep a record of his own balance between monthly or quarterly statements while making purchases. Unless the user of a debit card keeps a record of his account, as for example, in a record book which he carries with him, the user has no ready reference as to the amount of purchases left on the debit card, as the balance on his debit card is not in human readable form. Under these conditions, it is possible that he may unintentionally attempt to make purchases for which he has no funds.

Many people do not like to keep records of the type mentioned above, and consequently, the use of a "debit card" system may not be too attractive to them.

If the electronic terminal used with the debit card could write the updated balance and other pertinent date on the card in human readable form, the need for manually maintaining a balance could be avoided. However, for practical reasons, there are certain criteria which must be met in any system employing such a debit card. For example, while the updated balance on the card should be written in human readable form, it should normally be invisible so that it can not be read by a casual handler of the card, like a retail sales or bank clerk. Some viewing means is necessary to enable the user or owner of the card to read the normally invisible balance thereon when desired, and the cost of the system employing such a debit card should be low. The present invention meets the above criteria.

Some prior art disclosures which generally relate to prepayment systems, magnetic recording on record mediums, and means for viewing magnetically recorded data are shown in the following U.S. patents: 2,971,916, 3,013,206, 3,221,315, 3,683,382, 3,845,499, 3,846,830, 3,852,571, 3,873,975, 3,878,367, and 3,929,278.

SUMMARY OF THE INVENTION

This invention relates to a method of writing and viewing magnetic, human readable characters, a security system, and a viewing means therefore. A multi-track, magnetic recording means is used to record data in a human readable, but normally invisible form, on a record medium used in a security system such as a "debit" or prepayment system. A viewing means having a viewing window containing ferromagnetic particles is used to "read" the data on the record medium by placing the viewing window in operative proximity with the data on the record medium. An image corresponding to the data being read is formed on the viewing window to enable the data to be read, and the image is erased by providing relative movement between the viewing window and a magnet means.

Further advantages of this invention will be explained in connection with the following detailed description and drawings.

DETAILED DESCRIPTION OF THE INVENTION

Figure 1:
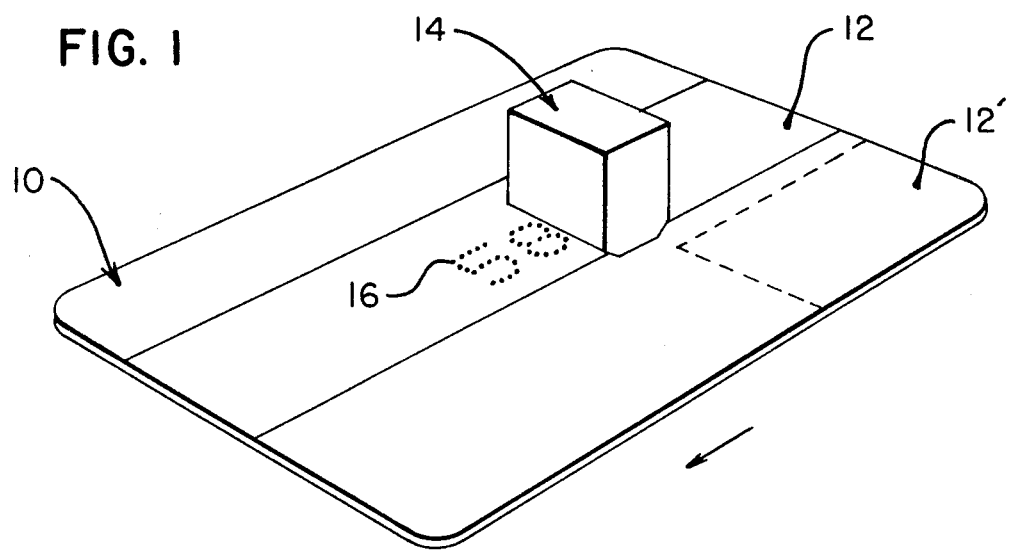
FIG. 1 is a general view, in perspective, of a recording means which may be used to magnetically record data in a human readable, but normally invisible form or style on a recording track of a record medium.

FIG. 1 is a general view, in perspective, of a record medium 10 which may be part of a "debit-card" or security system mentioned earlier herein. The record medium 10 has a magnetic recording track 12 thereon, and a recording means designated generally as 14 may be used to record data on the track 12 in a human readable but normally invisible style or form. The recording means 14 may be a multichannel magnetic read-write head, for example, which records data by generating flux transitions for a dot matrix pattern (like a 7×5 dot matrix) in the track 12 by conventional techniques as disclosed, for example, in U.S. Pat. No. 3,873,975 cited earlier herein. While the characters 16 are shown in visible form in FIG. 1, they would normally be invisible in the track 12. The recording means 14 is also capable of magnetically erasing the data recorded on the track 12 and updating a customer's debit balance, for example, as he makes purchases, and of reading said data for machine input purposes if found necessary or desirable. While only the recording means 14 is shown, it is actually part of a system for the automatic transferral of funds which does not form a part of this invention and may be conventional. One such funds transferral system is shown in U.S. Pat. No. 3,852,571 cited earlier herein.

While the recording track 12 (FIG. 1) is shown as extending across the length of the record medium, the recording track 12 may be placed at a compact area 12' of the record medium 10 if the design of a particular system required it. Alternatively, a record medium like 18, shown in FIG. 2, could be utilized with a conventional magnetic track 20 on one side thereof and an auxiliary magnetic track 22 which is used solely for the recording and updating of data which is related to the debit balance mentioned earlier herein. These variaions of record mediums like 10, 18, reflect the versatility and low cost of implementing this invention.

Figure 2:
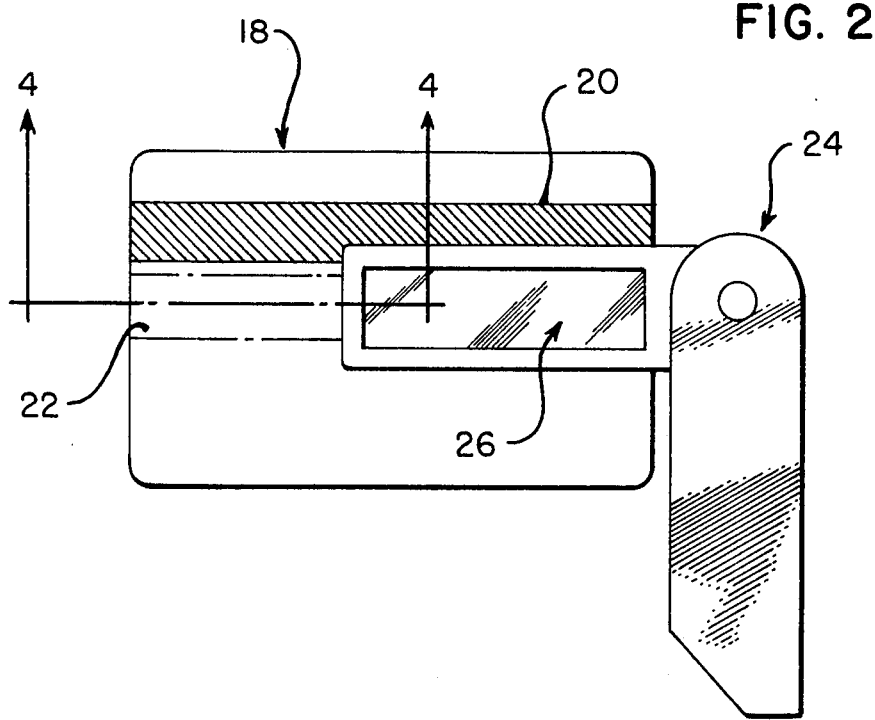
FIG. 2 is a general plan view of a record medium showing how a viewing window of a viewing means of this invention may be positioned in operative proximity with the recorded data on the record medium to enable a user of the viewing means to read the normally invisible data on the record medium.

As stated earlier herein, the characters 16 (FIG. 1) are written in human readable form, but are normally invisible. When a user of the record medium wishes to make a retail purchase, for example, he utilizes a viewing means designated generally as 24 to check on whether or not he has sufficient funds in his account to make the purchase. To utilize the viewing means 24, the user merely positions a viewing window or screen 26 of the viewing means 24 in operative proximity with the data on the recording track 22 by laying the viewing window 26 on the track 22. When the viewing window 26 is positioned on the track 22, an image is formed in the viewing window 26 corresponding to the data recorded on the track 22, enabling the user to ascertain whether or not he has a sufficient debit balance (in the example given) to make the intended purchase. Becuase the data 16 (FIG. 1) is recorded in humanly readable form, an image (not shown) similar to that shown in FIG. 1 will be formed in the viewing window 26 (FIG. 2). After using the viewing means 24, the user removes the viewing means 24 from the record medium 18, and the record medium 18 can be handed to a retail sales clerk to make the purchase. Note that the user may ascertain his debit balance on the record medium 18 in privacy, and when the record medium is handed to the sales clerk, the sales clerk is not able to read the data on the track 22. This enables the user of the record medium 18 to read his debit balance at any time, maintain confidentiality of his debit balance, and avoid having to keep financial records of his account. These are important features of this invention.

After the user of the viewing means 24 uses it, the image of his debit balance remains on the viewing window 26 thereof due to the construction of the viewing window 26. In order to erase the image on the viewing window 26, the viewing window 26 and a magnet means 28 (FIG. 3) are moved relative to each other to effect an erasing of the image by a technique to be described later herein in relation to FIGS. 3, 4 and 5.

Figure 4:
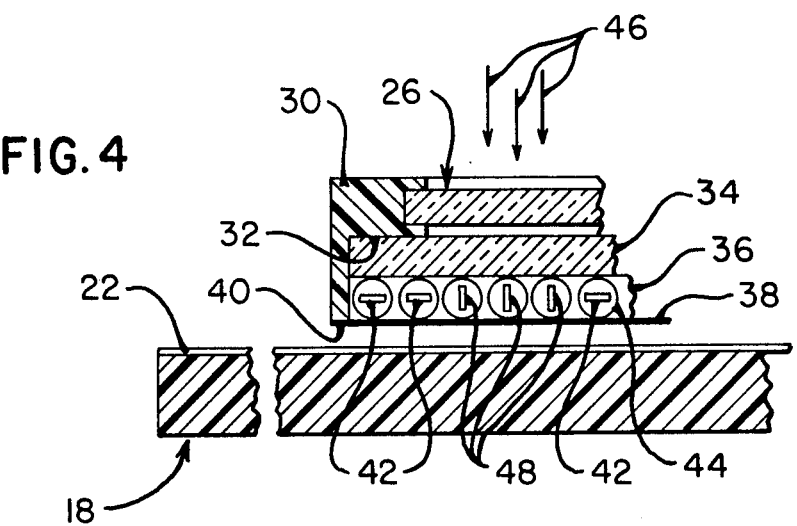
FIG. 4 is a cross-sectional view, taken along the line 4—4 of FIG. 2 to show the construction of the viewing window of the viewing means.

FIG. 4 is a cross-sectional view which shows the construction of the viewing window 26 and its relationship to the recording track 22 on the record medium 18. The viewing window 26 includes a window frame 30 having an abutment or peripheral shoulder 32 against which a clear substrate 34 such as plastic or glass is secured. A layer 36 of microscopic flakes or particles of encapsulated ferromagnetic particles is secured to the substrate 34 and an opaque or black layer 38 of paint, for example, is secured to the opposite side of the layer 36 to sandwich the layer 36 between the substrate 34 and the black layer 38 as shown. These layers 36, 38 and the substrate 34 are exaggerated in size to facilitate the showing thereof. The layer 38 is flush with the underside 40 of the frame 30 to enable the black layer 38 of the viewing window 26 to lie upon the recording track 20 in operative proximity therewith.

The theory of operation of the layer 36 (FIG. 4) of encapsulated ferromagnetic particle film (hereinafter called EMPF) as applied to this invention is as follows.

The layer 36 of EMPF basically comprises microscopic magnetic particles or flakes 42 which are supported in a solution within a capsule 44. There are many such capsules 44 comprising the layer 36. Only one flake 42 is shown in each capsule 44 in FIG. 4 for convenience; however, there are many such flakes 42 in each capsule.

In the initial state the flakes 42 are positioned parallel to the plane of layer 36 as shown by flakes 42 in FIG. 4. The flakes 42 are put into this position by subjecting them to a magnetic field as will be described later herein. Due to the reflective properties of the metal flakes 42 and the alignment of their flat faces, the window 26 will reflect light impinging upon it from above (as viewed in FIG. 4), providing the appearance of a mirror like surface. The color of the light reflected from the window 26 will be equal to the color of the incident light modified by any color absorbing dye which may be included in the layer 36 of EMPF.

If a magnetic field like 46 in FIG. 4 is applied to the layer 36 of EMPF in a direction which is perpendicular to the surface of layer 36, the flakes like 48 in the field 46 will align in a direction which is perpendicular to the surface of the layer 36 as shown in FIG. 4. Because the metal flakes like 42, 48 are very thin, the majority of the light arriving at the window 26 will pass directly between the flakes 48 and will be absorbed by the black layer 38. This absorption of light by the black layer 38 and the reflection of light from the flakes 42 which have not been affected by the magnetic field 46 will provide the necessary contrast to enable a user of window 26 to "read" the data on the record track 22. In an actual situation, not all the flakes 48 will align perfectly as shown in FIG. 4, but a significant number of them will be so aligned so as to provide the necessary contrast for reading. While this discussion has proceeded with the magnetic field 46 coming from above as shown in FIG. 4, the magnetic field actually comes from the magnetic flux transitions which have been recorded in the recording track 22 by the process shown in FIG. 1. Consequently, if the flux transitions recorded in FIG. 1 are recorded in human readable form as shown in FIG. 1, an image corresponding to the characters 16 will be formed in the layer 36 of EMPF shown in FIG. 4 when the viewing window 26 is placed in operative proximity with the record track 22 as shown in FIGS. 2 and 4. In actual use, the black layer 38 contacts the recording track 22, however, the layer 38 is shown as being spaced from track 22 to facilitate the showing in FIG. 4.

After reading the data in the recording track 22, the viewing window 26 may be removed therefrom. After removal of the viewing window 26, the image formed thereon will still be retained. This is due to the fact that the layer 36 of EMPF used exhibits memory characteristics and requires some form of "erasure" prior to being reused. This memory phenomenon has been explained as a combination of the effects of "wall friction" between the particles and inner wall of the encapsulating capsule and "minimum-energy-states" of the magnetic particles. Regardless of the exact reason, the image formed in the viewing window 26 is erased by subjecting it to a magnetic field as will be described later herein.

As an example of the materials used, the recording track 22 may be composed of conventional magnetic materials such as gamma ferric oxide, and the track 22 may be about .002 inch thick to provide a sufficient field strength to provide sufficient contrast for the images formed in the viewing window 26. When recording the magnetic "dots" comprising the characters 16 shown in FIG. 1, the recording means 14 may be a multi-track recording head whose magnetic gaps exceed .001 inch. The active material in the layer 36 of EMPF preferably contains microscopic nickel platelets or flakes such as are found in samples 7380-16-1-4B, 7380-22-2B, 8456-51-2, and 8456-51-1, which are manufactured by the Capsular Products Division of NCR Corporation. In addition to the above named capsular products, other encapsulated magnetic particles such as those, for example in the shape of needles rather than flakes and/or composed of other materials such as ferric oxide may be used; however, the flakes appear to work best. While the length of the window 26 shown in FIG. 2 covers only about half the length of the recording track 22, the length could be extended to cover the entire length of the track 22 if data along the entire length were to be read. Also, the shape of the window 26 could be modified to cover the area 12′ of FIG. 1 if the design of a particular system empolying the viewing means 24 dictated it.

Figure 3:
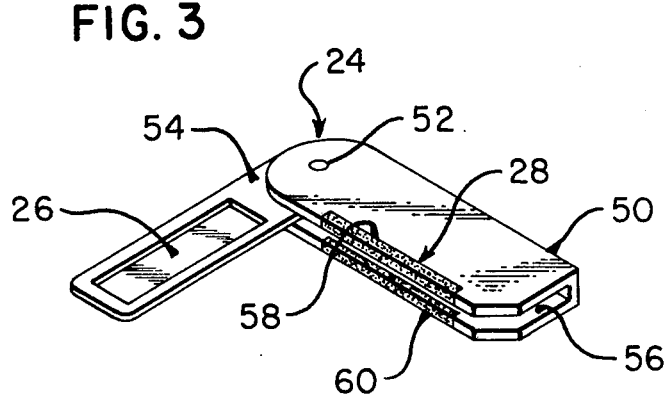
FIG. 3 is a general perspective view of the viewing means shown in FIG. 2 and shows a magnet means and a means for providing relative motion between the viewing window and the magnet means to erase an image which is formed on the viewing window during the reading process shown in FIG. 2.
Figure 5:
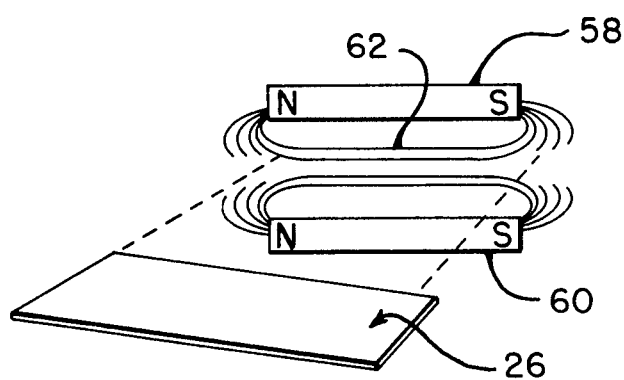
FIG. 5 is a diagrammatic view, showing the relationship between the viewing means and the lines of flux of the magnet means to erase the image formed on the viewing window during the reading process.

The method for erasing the image formed on the viewing window 26 after a reading of the data on track 22, for example, is best described in relation to FIGS. 3 and 5. In order to affect an erasure of the image formed on viewing window 26, the viewing window 26 must be subjected to a magnetic field of a special orientation.

In the embodiment of the viewing means 24 shown in FIG. 3, the erasure of the image on the viewing window 26 is effected by providing relative movement between the viewing window 26 and the magnet means 28. The means for effecting the relative movement includes frame means 50 and a pivot means or pin 52 located at one end of the frame means 50. The viewing window 26 has one end 54 thereof which is inserted in an opening 56 in the frame means 50 and pivotally joined to the pin 52 to enable the viewing window 26 to be moved into and out of the frame means 50 in the manner of a folding pen knife. The magnet means 28 includes first and second magnets 58, 60 respectively, which are located on opposed sides of the opening 56, and they have their poles arranged in opposing relationship as shown in FIG. 5 to produce a magnetic field 62 which lies in the plane of the viewing window 26. When the viewing window 26 is moved into the opening 56, the particles or flakes 48 (FIG. 4) which were aligned perpendicular to the plane of the layer 36 of capsules (representing an image) become realigned like the flakes 42 so that the image is no longer visible or is erased. The viewing window 26 can then be withdrawn from the frame means 50 to enable the viewing window 26 to be positioned over the recording track 22 (FIG. 2) to effect another reading as previously described. The frame means 50 may be made of a plastic or other suitable material, and the spacing of the magnet means 28 from the viewing window 26, when in the reading position shown in FIG. 2, provides sufficient spacing between the magnet means 28 and the recording track 22 and track 20 so that the tracks 20 and 22 are not adversely affected by the magnet means 28.

Figure 6:
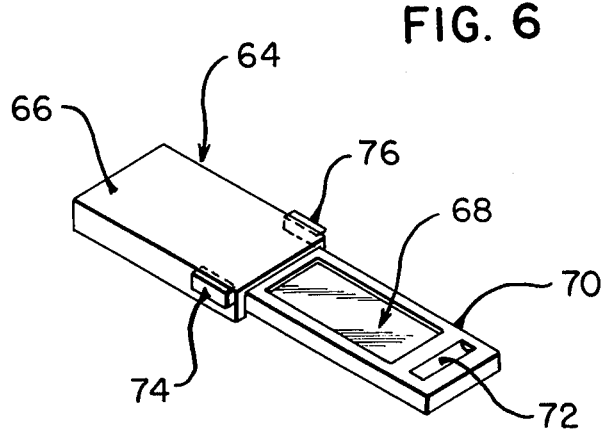
FIG. 6 is a general perspective view of a second embodiment of the viewing means of this invention.
Figure 7:
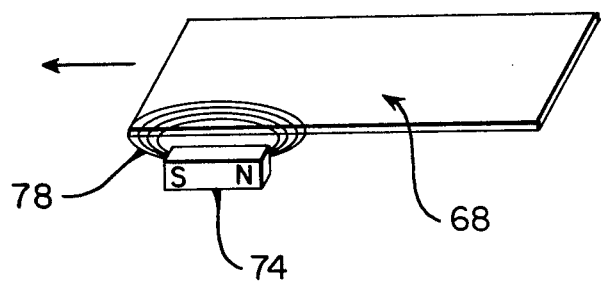
FIG. 7 is a diagrammatic view, showing the relationship between the viewing means and the lines of flux of the associated magnet means to erase the image formed on the viewing window.

FIG. 6 shows another embodiment of viewing means of this invention which is designated generally as 64. The viewing means 64 includes a frame means 66 which has an opening on one end thereof to receive a rectangular viewing window 68 which is identical to window 26 previously described. The viewing window 68 is mounted in a rectangular frame 70 which is similar to frame 30, and has a finger recess 72 therein to enable the frame 70 to be readily grasped. The frame means 66 and the viewing window 68 are moved reciprocally relative to each other to provide the relative motion between the window 68 and the associated magnet means which includes permanent magnets 74, 76. The field of the magnets 74, 76 like field 78 associated with magnet 74 (FIG. 7) lies in the plane of the viewing window 68 as previously described. In general, if the width of the viewing window 68 is less than 0.25 inch wide, a single magnet like 74 of convenient size (e.g. $\frac{1}{8}$ inch square × $\frac{1}{2}$ inch long) and providing a flux density of 400 to 500 gauss at its surface will provide a flux density which is sufficient for erasure. For widths of the viewing window 68 greater than 0.25 wide, it is preferable to utilize the second magnet 76 (identical to magnet 74) to provide for more thorough erasing. The viewing means 64 is used for reading with the viewing window 68 in the extended position shown in FIG. 6, and the viewing window 68 is simply pushed into the frame means 66 to erase the image formed on the viewing window. While the various magnets 58, 60, 74 and 76 are described as permanent magnets, electromagnets may be substituted therefor providing the frame means 50, 66 are conventionally modified to include an energizing source for the electromagnets (not shown).

What is claimed is:

1. A security system comprising:

a record medium having a recording track thereon;

means for magnetically recording data on said recording track in a humanly readable style which is normally invisible; and a viewing means comprising:

a viewing window which when placed in operative proximity with said recording track responds to said data thereon to form an image on said viewing window corresponding to said data to enable a user of said viewing means to read said data;

magnet means; and means for providing relative movement between said viewing window and said magnet means to erase said image upon said relative movement;

said magnet means being located on said providing means so as to enable the magnetic lines of flux of said magnet means to lie in the plane of said viewing window during said relative movement.

2. The system as claimed in claim 1 in which said viewing window contains ferromagnetic particles.

3. The system as claimed in claim 1 in which said viewing window is comprised of a transparent substrate and a layer of micro-encapsulated ferromagnetic particles attached thereto.

4. The system as claimed in claim 1 in which said viewing window is comprised of a transparent substrate, a layer of micro-encapsulated ferromagnetic particles having one side thereof attached to said transparent substrate, and an opaque coating applied to said layer of micro-encapsulated ferromagnetic particles on the remaining side thereof.

5. A credit card system comprising:
a credit card having a magnetic recording track thereon;
means for magnetically recording data such as a user's debit balance, on said track in a humanly readable style which is normally invisible; and
a portable viewing means which when placed in operative proximity with said track responds to said data to thereby enable a user of said viewing means to read said data;
said portable viewing means comprising:
a viewing window having micro-encapsulated ferromagnetic particles therein, which said particles respond to said data on said recording track to leave a readable image on said viewing window;
magnet means; and
a frame means for providing relative movement between said viewing window and said magnet means to enable said magnet means to erase said image on said viewing window upon relative movement therebetween;
said magnet means being located on said frame means so as to enable the magnet lines of flux of said magnet means to lie in the plane of said viewing window during said relative movement.

6. A viewing means for reading normally invisible magnetic data on a recording track comprising:
a viewing window containing magnetic particles and being shaped to be positioned in operative proximity with said recording track to thereby form an image on said viewing window corresponding to the data on said recording track to enable a user of said viewing means to read said data;
magnet means; and
means interconnecting said viewing window and said magnet means to provide relative movement therebetween to enable said magnet means to erase said image formed on said viewing window.
said magnet means being located on said interconnecting means so as to enable the magnetic lines of flux of said magnet means to lie in the plane of said viewing window during said relative movement.

7. The viewing means as claimed in claim 6 in which said viewing window includes a substrate, and in which said magnetic particles are encapsulated to form a layer of encapsulated magnetic particles, which said layer is secured to said substrate.

8. The viewing means as claimed in claim 7 in which said magnetic particles are microscopic flakes of nickel.

9. The viewing means as claimed in claim 7 in which said viewing window further includes a layer of opaque material secured to said layer of encapsulated magnetic particles to sandwich said layer of encapsulated magnetic particles between it and said substrate; said viewing window having said layer of opaque material next to said recording track when said window is in operative proximity therewith.

10. A portable viewer for reading normally invisible magnetic data on a recording track, comprising:
a window means;
a frame means enabling relative motion between said window means and said frame means;
said window means comprising a substrate having a layer of encapsulated magnetic particles secured thereto;
said window means, when placed in operative proximity with said recording track by contacting said recording track, responding to said magnetic data to thereby form an image on said window means to enable a user of said viewer to read said data on said recording track;
magnet means positioned on said frame means so as to enable the magnetic lines of force or flux of said magnet means to lie in the plane of said window means to enable said image to be erased upon the relative movement of said window means and frame means.

11. The viewer as claimed in claim 10 in which said frame means has an opening therein to receive said window means and has mounting means thereon to enable said window means to be moved between an extended position from which said window means may be placed in operative proximity with said recording track, and a retracted position in which said window means is housed in said opening.

12. The viewer as claimed in claim 11 in which said mounting means includes a pivot means mounted in one end of said frame means, and said window means has one end thereof which is pivotally mounted on said pivot means to effect said relative motion between said window means and said frame means.

13. The viewer as claimed in claim 11 in which said window means has parallel sides, and said mounting means includes parallel walls in said opening to enable said window means to be reciprocated between said extended and retracted positions.

14. The viewer as claimed in claim 10 in which said magnet means is positioned adjacent to said opening in said frame means.

15. The viewer as claimed in claim 14 in which said magnet means has a flux density of about 400 to 500 gauss, and said window means has a length and width, with said width being less than 0.25 inch.

16. The viewer as claimed in claim 14 in which said magnet means comprise first and second permanent magnets which are placed on opposed sides of said opening in said frame means with like poles of said first and second magnets being opposite each other.

17. A method of using a debit balance in a credit card system comprising the steps of:
(a) recording debit balance data magnetically on a recording track on a credit card in a humanly readable style;
(b) placing a viewing means having a viewing window containing micro-encapsulated ferromagnetic particles in operative proximity with said recording track to form an image corresponding to said data on said viewing window to enable a user of said credit card to read said debit balance on said credit card; and
(c) moving said viewing window and a magnet means relative to each other to erase said image formed on said viewing window.

* * * * *